Dec. 4, 1928.

H. C. LYONS

FLUID MEASURING FAUCET

Filed May 4, 1925

INVENTOR:
Harry C. Lyons
BY
Geo. Wm Miatt
ATTORNEY

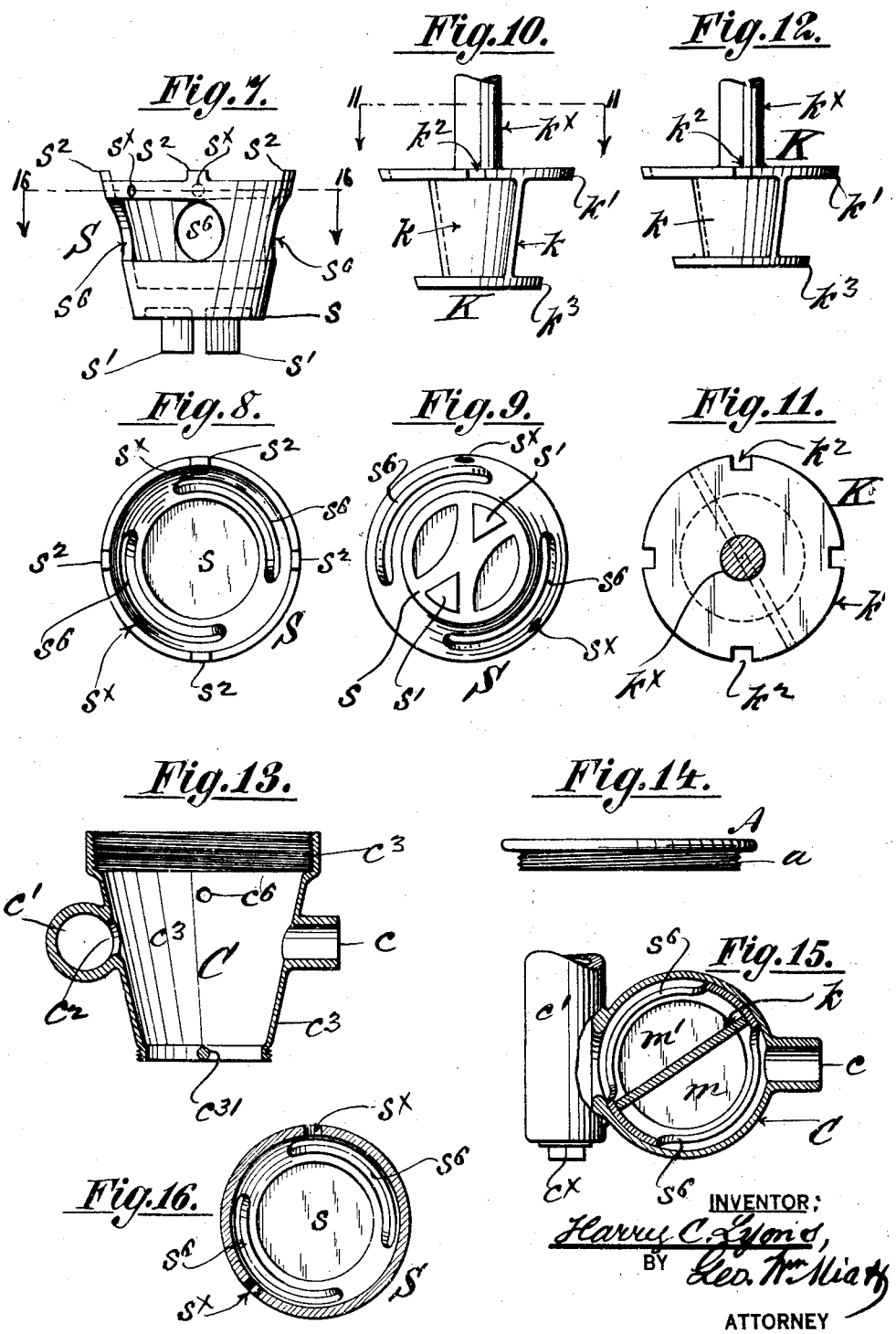

Patented Dec. 4, 1928.

1,693,719

UNITED STATES PATENT OFFICE.

HARRY C. LYONS, OF MOUNT VERNON, NEW YORK.

FLUID-MEASURING FAUCET.

Application filed May 4, 1925. Serial No. 27,681.

My improvements relate to faucets for measuring prescribed quantities of fluids, and delivering same to a receptacle suitably positioned under the spout of the faucet.

My main object is to attain a simple structure of faucet, the parts of which are easily accessible for cleansing and rendering sanitary, and in which provision is made for changing the measuring capacity of the faucet according to requirements.

A further object of the invention is to provide a construction for the faucet in which a fluid measuring chamber, which is designated as the spigot shell, is divided into two compartments by a removable element, which is designated as the partition core. A number of these partition cores may be provided, constructed so as to be interchangeably inserted in the spigot shell, of different sizes or capacities for determining the successive amounts of fluid to be measured and delivered. This spigot shell and one of the partition cores are positioned one within the other and interlocked for reciprocal movement in the faucet casing by means of an operating handle, whereby each reciprocal movement of the handle of the spigot plug effects the discharge of a prescribed quantity of fluid, while said spigot plug is simultaneously receiving and measuring the next succeeding quantity of fluid for discharge, all as hereinafter fully set forth.

In the accompanying drawings I illustrate a practical embodiment of the essential features of my invention, although I do not limit myself to the identical form and construction shown by way of exemplification, since changes may be made in minor details and equivalent mechanical expedients resorted to, with like results and without departing from the spirit and intent of my invention in this respect.

With this understanding:—

Fig. 7, is a detail side elevation of the spigot shell removed from the casing;

Fig. 8, is a detail front end elevation of the spigot shell;

Fig. 9, is a detail rear end elevation of the spigot shell;

Figure 3:
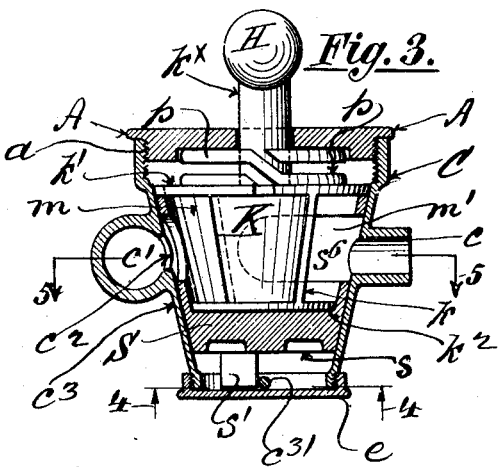
Fig. 3, is a sectional elevation taken upon plane of line 3—3, Fig. 2.
Figure 6:
Fig. 6, is a detail plan view of the compression spring.
Figure 5:
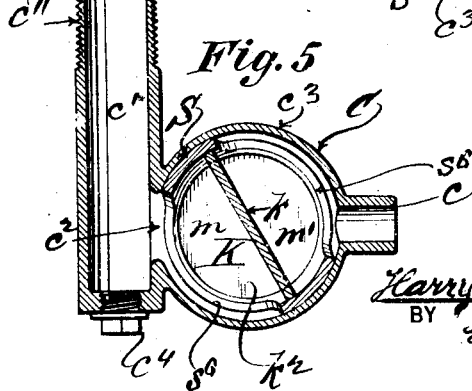
Fig. 5, is a sectional elevation taken upon plane of line 5—5, Fig. 3.

Fig. 10, a detail side elevation of one of the partition cores;

Fig. 11, is a sectional elevation taken upon plane of line 11—11, Fig. 10;

Fig. 12, is a view similar to Fig. 10, showing a different size of partition core;

Fig. 13, is a section of the casing alone, taken upon the same plane as Fig. 3;

Fig. 14, is a side elevation of the front cap plate;

Fig. 15, is a section similar to Fig. 5, the two figures showing the alternative positions of the spigot shell and partition core as related to the casing;

Fig. 16, is a section taken upon plane of line 16—16, Fig. 7.

Figure 1:
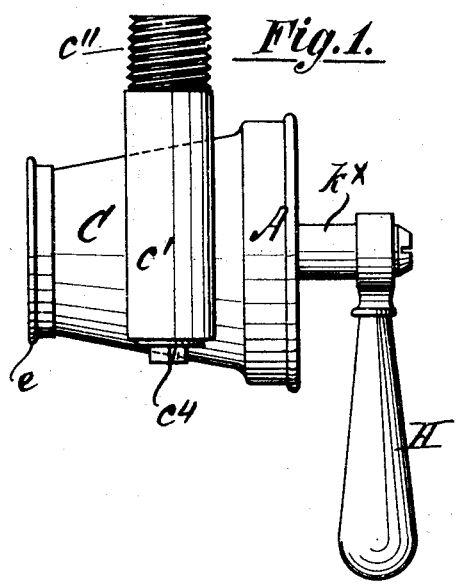
Fig. 1, is a top view of my improved measuring faucet.
Figure 2:
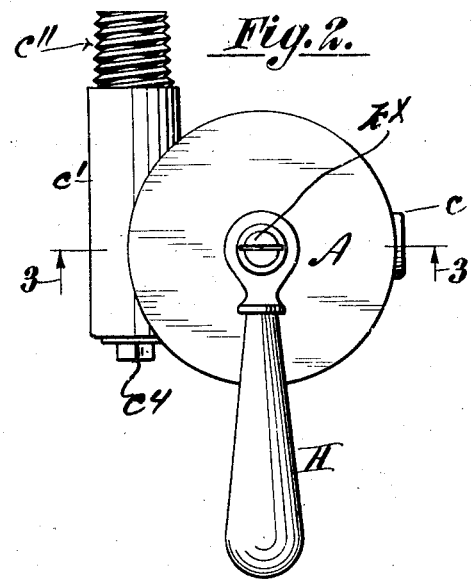
Fig. 2, is a front elevation thereof.

In this connection it may be mentioned in exlpanation of the drawings, which show the construction clearly, that in practice the inlet tube preferably extends horizontally and the discharge spout vertically, although the device is operative in other positions. Thus Figs. 1 and 2, show the ordinary position of the faucet in use,—the other views the construction.

The body of the casing C, is of truncated conical shape to conform to the truncated conical spigot shell S. The casing is formed integral with the discharge spout $c$, and with the inlet tube $c'$, which latter has the lateral port $c^2$, opening into the barrel $c^3$, of the casing C, considered as an entirety. The inlet tube $c'$, is formed at its extremity with a peripheral screw thread $c''$, for attachment to a fluid container of any desired character, it being understood that the inlet $c'$, through the inlet port $c^2$, communicates with the entrance of fluid receptacle or spigot shell S through one of the apertures $s^6$ in certain positions, as will be explained hereinafter. The forward end of the inlet tube $c'$, extends beyond the barrel $c^3$, of the casing C, where it is provided with a detachable closure $c^4$, to facilitate cleaning. The discharge spout $c$, is shown as located diametrically opposite to the inlet port $c^2$. The inner or truncated end of the barrel $c^3$, of the casing C, is formed with a diametrically positioned rigid cross bar $c^{31}$, which performs the function of a stop to limit the rotative movement of the spigot shell S, in either direction.

Figure 4:
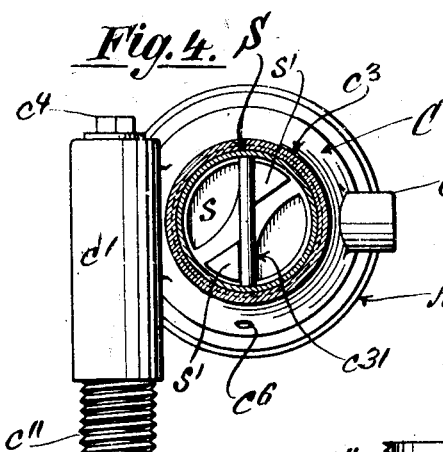
Fig. 4, is a sectional elevation taken upon plane of line 4—4, Fig. 3.

As shown in Fig. 4, diametrically opposed

V shaped lugs $s'$, $s'$, on the truncated end $s$ of the spigot shell S, contact alternately with said cross bar $c^{31}$, as the spigot shell S is rotated first in one direction and then in the other, thereby limiting the rotative movement of the said spigot shell in both directions, and insuring the registry of ports and openings hereinafter set forth.

Fitting within the spigot shell S, is positioned one of the selected partition cores K, each of which is similarly formed with a diametrically medial partition $k$, by which the spigot shell S is divided into two measuring compartments of equal size and area. The partition cores K are of different size or capacity (Figs. 10 and 12 showing two such cores) and are interchangeable, each being constructed and arranged to be detachably connected with the spigot shell in such manner that both core K and shell S are rotatable as a unit,—which detachable coupling or interlocking of parts may be accomplished by the means shown in the drawings by way of exemplification, in which the outer, larger disc $k'$, of the partition core K, is shown as formed with notches or recesses $k^2$, $k^2$, for the accommodation of lugs $s^2$, $s^2$, formed for the purpose on the outer edge of the spigot shell S, as will be seen by reference more particularly to Figs. 7, 8, 10, 11 and 12, of the drawings.

Each partition core K, is formed with an inner end disc $k^3$, integral with the partition $k$, the diameter of said inner end disc $k^3$, being equivalent to that of the diameter of the inner portion of the surface of the spigot shell S, within which it is designed to fit and contact snugly, so that when a partition core K is properly positioned within the spigot shell S, the main portion of the latter will be divided into two separate compartments, $m$ and $m'$ one on each side of said partition $k$, as illustrated more particularly in Figs. 3 and 5, of the drawings.

The spigot shell S, and its partition core K, thus fixedly coupled together, are turned in unison on their common central axis by means of a handle H, secured rigidly to the outer end of a spindle $k^x$, which is formed with, or integrally attached to, the partition core K, said spindle $k^x$ extending through the face cap plate A, which is screwed to the front edge or rim of the barrel $c^3$, of the casing C, as shown more particularly in Fig. 3, of the drawings.

The medial portion of the spigot shell S, is divided into two measuring compartments $m$, $m'$, by the partition $k$, of the core K, and the sides of said spigot shell S are formed with apertures $s^6$, $s^6$, providing communication alternately with the inlet $c^2$ and the discharge $c$, as the spigot shell and partition are revolved or reciprocated by the handle H.

Interposed between the face cap A and the outer disc $k'$, of the partition core K, is a pressure spring $p$, which holds said partition core K and the conical spigot shell S firmly in position against the concavo-conoidal seat in the casing C, as will be seen by reference particularly to Fig. 3, thus insuring and maintaining a fluid tight engagement between spigot shell and casing where the surfaces thereof are in contact. $e$ is a rear end cap which encloses and protects the cross bar $c^{31}$, and inner end of the spigot shell from contact with extraneous objects and the atmosphere.

The lugs $s'$, $s'$ (Figs. 3-4), acting in conjunction with the cross bar $c^{31}$, allow the spigot shell S and partition core K to be turned a portion only of a revolution in either direction; and the partition $k$, is so positioned centrally and diametrically in the plane of the axis of the spigot shell that direct communication between the inlet port $c^2$ and the discharge spout $c$, is closed. Thus in Fig. 5, the measuring compartment $m'$, is in communication with the discharge spout $c$, while the other measuring compartment $m$, is in communication with the inlet $c'$, through the port $c^2$, said Fig. 5 representing one extreme of the position of the spigot shell; whereas the other extreme of position of said spigot shell S, is shown in Fig. 15, with the measuring compartment $m$, in communication with the discharge spout $c$, and the other measuring compartment $m'$, in communication with the inlet tube $c'$. Thus, in use, while one measuring compartment is being discharged of its contents, the other is receiving its charge of fluid, so that there is no lost time nor motion, each alternate stroke of the handle H, resulting in the discharge of a prescribed quantity of fluid, and at the same time effecting the reception and measurement of the next succeeding quantity to be dispensed.

In order to facilitate the discharge of the fluid from the measuring compartments $m$, $m'$, the shell S is formed with two vents $s^x$, $s^x$ (Figs. 7, 8, 9 and 16), spaced circumferentially a distance equal to the rotary movement of the shell in either direction and positioned to be brought into coincidence alternately in either extreme position as the spigot shell is reciprocated with a vent $c^6$ (Figs. 4 and 13) in the barrel $c^3$ of the casing C. Thus one spigot shell vent $S^x$ (Fig. 16) is in coincidence with the casing vent $c^6$ (Fig. 13), the shell S then being in one extreme position, thereby admitting air to the compartment $m'$, which is open to the discharge spout $c$, as shown in Fig. 5. Upon the reverse movement of the handle H and shell S the other vent $S^x$ will, in turn be brought into coincidence with the vent $c^6$ and admit air to the other compartment $m$ when the latter is open to the spout $c$, as shown in Fig. 15. These vents $c^6$ and $S^x$ do not show in Figs. 5 and 15, as these sectional views are taken below that portion of the shell S and casing C in which the vents are formed (see Figs. 7 and 13). The air from the other previously discharged measuring compartment of the spigot shell in communication with the inlet $c'$, $c^2$, passes out freely therethrough and through the liquid supply, by which latter it is readily displaced.

Hence I attain a "rapid fire" measuring faucet by means of which both time and movement are utilized to the fullest extent, one side of the spigot faucet being recharged with fluid during the discharge of fluid from the other side in communication with the discharge spout, this simultaneity of action being of great advantage where the faucet is required for constantly repeated and continuous use, as in dispensaries, restaurants etc., where economy of time is an important consideration. In other words, "fill up" delay is eliminated, the time of service being that required to discharge one measuring compartment, plus the time required to reverse the spigot shell by means of its handle.

By the provision for the spigot shell S, of two or more interchangeable partition cores K (Figs. 10 and 12), of different chamber area, my duplex measuring faucet may be quickly and conveniently adapted to varying requirements of use by removing the cap A, and spring $p$, lifting out the partition core K, and substituting another one in lieu thereof, and then replacing both spring $p$, and cap A,—a simple operation requiring no skilled labor.

Furthermore, this construction and arrangement of parts facilitates the cleansing thereof, an important practical consideration in a measuring faucet of this character.

What I claim as my invention and desire to secure by Letters Patent, is:—

1. A measuring faucet comprising a casing provided with inlet and discharge ports, a shell rotatably positioned in said casing, a partition core removably positioned in and dividing said shell into two measuring compartments arranged and adapted to be brought alternately and simultaneously in comunication with said inlet and discharge ports by a rotative movement of said shell and core, interacting means on said shell and core connecting the same together for simultaneous rotative movement while permitting said core to be removed independently from said shell, and means for imparting a rotative movement to said core and shell.

2. A measuring faucet comprising a casing provided with inlet and discharge ports, a shell rotatably positioned in said casing, means coacting therewith to interchangeably receive any one of a number of partition cores of different capacities, a partition core of predetermined capacity removably positioned in and dividing said shell into two measuring compartments arranged and adapted to be brought alternately and simultaneously in communication with said inlet and discharge ports by a rotative movement of said shell and core, interacting means on said shell and core connecting the same together for simultaneous rotative movement while permitting said core to be removed independently from said shell, and means for imparting a rotative movement to said core and shell.

3. A measuring faucet comprising a casing provided with inlet and discharge ports, a shell rotatably positioned in said casing, a partition core removably positioned in and dividing said shell into two measuring compartments arranged and adapted to be brought alternately and simultaneously in communication with said inlet and discharge ports by a rotative movement of said shell and core, interacting means on said shell and core connecting the same together for simultaneous rotative movement while permitting said core to be removed independently from said shell, removable resilient means positioned in said casing, engaging and holding said core in position in said shell and said shell in operative position in and in engagement with said casing.

4. A measuring faucet comprising a casing provided with inlet and discharge ports, a shell rotatably positioned in said casing, a partition core formed with end disks and a partition therebetween, removably positioned in and dividing said shell into two measuring compartments arranged and adapted to be brought alternately and simultaneously in communication with said inlet and discharge ports by a rotative movement of said shell and core, interacting means on said shell and core connecting the same together for simultaneous rotative movement while permitting said core to be removed independently from said shell, and means for imparting a rotative movement to said core and shell.

5. A measuring faucet comprising a casing provided with inlet and discharge ports, a shell rotatably positioned in said casing, a partition core removably positioned in and dividing said shell into two measuring compartments arranged and adapted to be brought alternately and simultaneously in communication with said inlet and discharge ports by a rotative movement of said shell and core, interacting means on said shell and core connecting the same together for simultaneous rotative movement while permitting said core to be removed independently from said shell, co-operating means on said casing and shell for controlling the rotative movement of said shell and core, and means for imparting a rotative movement to said core and shell.

HARRY C. LYONS.